Nov. 11, 1952  L. G. DAVIES  2,617,295
MEASUREMENT OF THE FLOW OF LIQUIDS THROUGH
GRIDS AND OTHER BAFFLING DEVICES
Filed June 17, 1946  3 Sheets-Sheet 1
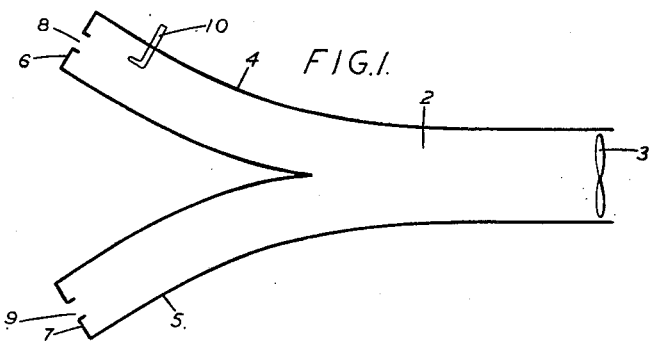
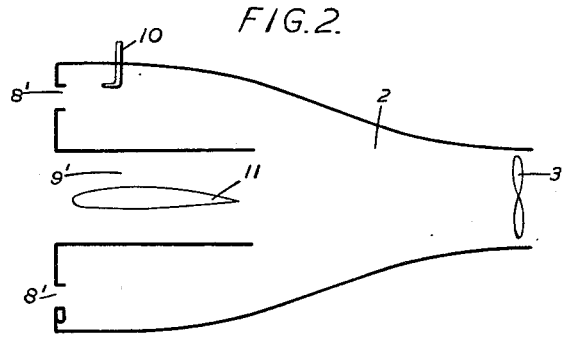
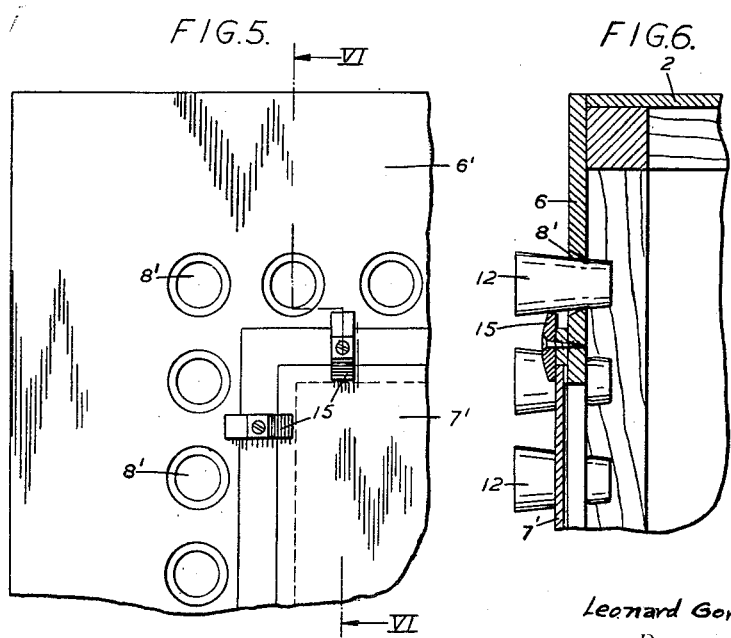
Inventor
Leonard Gordon Davies
By
Emery, Holcombe & Blair
Attorney Patented Nov. 11, 1952

2,617,295

UNITED STATES PATENT OFFICE 2,617,295

MEASUREMENT OF THE FLOW OF LIQUIDS THROUGH GRIDS AND OTHER BAFFLING DEVICES

Leonard Gordon Davies, Pinner, England

Application June 17, 1946, Serial No. 677,254
In Great Britain June 19, 1945

6 Claims. (Cl. 73—147)

This invention relates to the measurement of the flow of gaseous fluids through orifices, ventilators and so on and past aerofoils and like articles, which will be referred to herein generally as test-pieces.

Such measurements are normally made directly. The air or other gaseous fluid is caused to pass through or past the test-piece, and direct measurements are made of the pressure or the velocity of flow of the emergent stream. The work involved in determining the efficiency of a ventilator, for example, under different conditions by this method is very heavy. The number of readings which have to be taken is very large because the stream or streams which emerge from the test-piece are turbulent and enough readings have to be taken to enable a reliable average result to be obtained. Furthermore, a great deal of computation and calculation is necessary in order to deduce a practically useful result from the experimental readings.

The invention aims at simplifying the method of measurement and improving the accuracy of the results.

In accordance with the invention, no direct measurement of flow through or past the test-piece is made. Instead, an apparatus is used in which the flow of gaseous fluid in a stream which does not pass immediately by or across the test-piece is caused to vary quantitatively proportionately to the degree of obstruction to flow of the gaseous fluid caused by the test-piece. It is easy to ensure that the stream which does not pass closely by or across the test-piece is non-turbulent and, therefore, it is easy to obtain accurate readings of the pressure or velocity of flow in that stream and from readings so obtained to calculate indirectly the flow by the test piece. As will be made clear further on, it is not essential, however, that the stream be non-turbulent.

In its most practical form the apparatus consists of a wind tunnel having a variable output suction fan at one end and closed at the other by a screen having an aperture in it in which the test piece can be mounted and a number of auxiliary apertures. For convenience, although this is not essential, the auxiliary apertures are all alike. They can be of any desired shape and it is easy to ensure that air which is drawn through them will flow in non-turbulent streams. This, again, is not essential, but is advantageous as it allows simple means such as a Pitot tube to be used for the direct measurement of the flow of air through them. The apparatus is completed by means for closing the test-piece aperture when desired and means for closing any or all of the auxiliary apertures. The test piece aperture can be a simple opening in the screen or it can be defined by a tube passing through or extending outwards or inwards from the screen.

The apparatus described briefly above can be used to determine the amount of air which an object placed in the test-piece opening allows to get past or through it and the amount of air which is prevented from passing through the aperture.

Such information, when related to the velocity of the air which passes the test-piece or the volume of air which passes in unit time (both of which are easily determined) enables all the essential characteristics of a ventilator, for example, to be determined.

The general principle underlying the method of using the apparatus will be clearly understood by an appreciation of the following.

Suppose the fan to be running at constant speed with the test-piece aperture and a number of auxiliary apertures open and unobstructed. Air will be drawn through all those apertures and the velocity of flow through any one of them can be easily measured by a Pitot tube.

Suppose now, that a test-piece is mounted in the test-piece aperture so as partially to obstruct it. If the fan maintains its output, the same amount of air will pass through the apertures but, because of the partial obstruction caused by the test-piece the velocity of flow through the apertures will increase. This can, again, be simply measured by means of the Pitot tube. If the area of the apertures is known, a simple equation can be drawn up in which the obstruction to flow offered by the test-piece is expressed in terms of the difference in the velocity of flow in the two cases given above and the area of the apertures, all of which factors are known.

Suppose now, that the test-piece aperture is completely closed and the velocity of flow through the auxiliary apertures is measured by the Pitot tube.

Suppose now, that a test-piece such as a ventilator is mounted in the screen, some air will pass through the test-piece and, the output of the fan remaining constant, the velocity of flow through the auxiliary apertures will decrease. Again, a simple equation can be drawn up in which the amount of air which has passed through the ventilator is expressed in terms of the difference in the velocity of flow in the two cases and the area of the auxiliary apertures, all of which factors are known.

By repeating such experiments at different fan speeds, that is to say at different volumetric outputs, the characteristics of the test-piece under different conditions can be obtained.

In order that the invention may be properly understood and be more readily carried into effect, it will now be more fully described by way of example with reference to the accompanying drawings in which:

Figures 1 and 2 are diagrammatic representations of apparatus in accordance with the invention.

Figure 5 is an enlarged view of a portion of the apparatus shown in Figure 4 and Figure 6 is a section taken on the line VI—VI in Figure 5.

Figure 3:
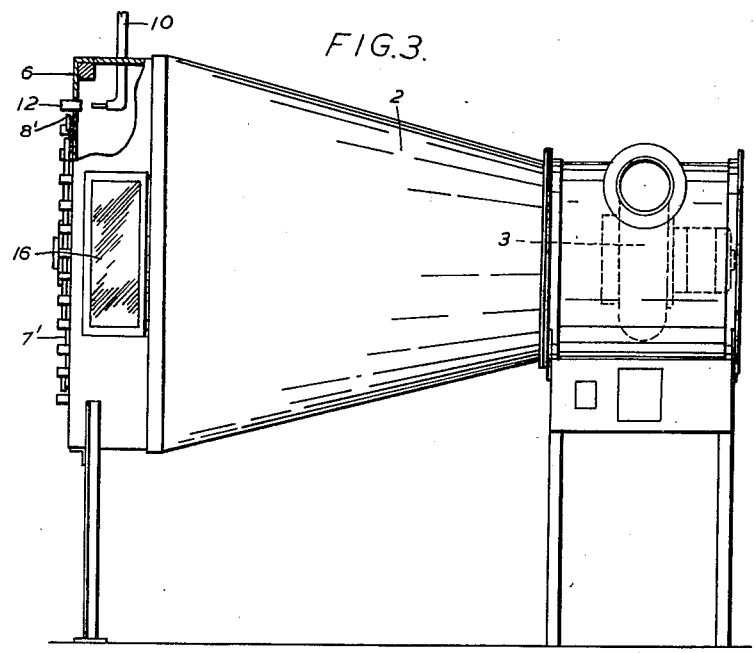
Figure 3 is an outside elevation of the preferred form of apparatus for the testing of ventilators.
Figure 4:
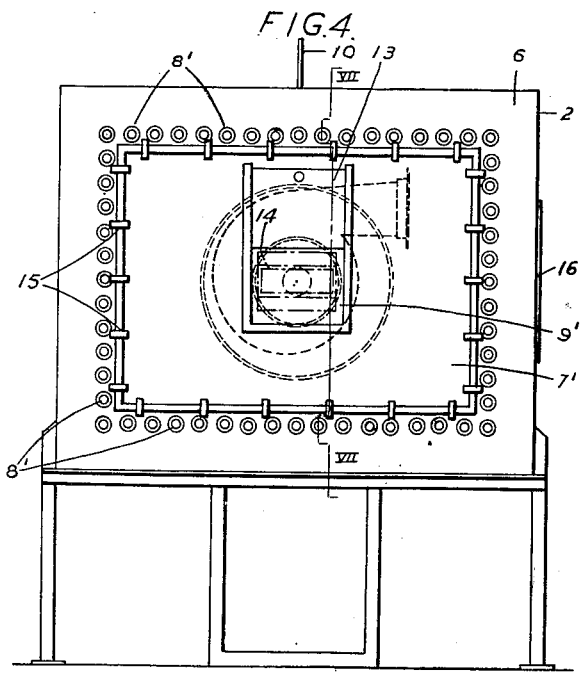
Figure 4 is a left hand end view of the apparatus shown in Figure 3.

The apparatus shown diagrammatically in Figure 1 consists of a bifurcated tube 2 having a suction fan 3 in one end of it. The ends of the branches 4 and 5 are closed by plates 6 and 7 having apertures 8 and 9 in them.

If the fan 3 is started up, air will be drawn through the apertures 8 and 9, the velocity of flow through them being dependent upon the relative areas of the apertures.

If one of the apertures, say the aperture 9, is obstructed, the amount of air drawn through the other aperture will increase and so therefore will the velocity through that aperture.

The velocity through the aperture 8 can be measured by means of the Pitot tube 10 or other device, and the difference in the velocity through that aperture under the two sets of conditions given above can be easily ascertained. If then, the area of the aperture 8 is known, the amount of air which was not allowed to pass through the aperture 9 because of the presence of the obstruction in it can be obtained by a simple calculation. This result can be obtained without a knowledge of the area of the aperture 9 and without a knowledge of the physical characteristics of the obstruction.

If readings are taken of the velocity through the aperture 8 both when the aperture 9 is closed altogether and when it is partially obstructed, the product of the difference in velocities and the area of the aperture 8 will give the amount of air which has passed the obstruction.

The aperture 8 can be designed so as to give non-turbulent flow through it so that accurate readings of the velocity through it are readily obtained. The area of the aperture is a constant of the apparatus and, once determined need never again be determined and, therefore, the calculations involved are extremely simple. By "area of the aperture" is, of course, meant the effective area, which takes into account the resistance to flow through the aperture.

In the practical application of this aparatus, the aperture 9 would serve to receive a test-piece such as a ventilator.

A bifurcated tube such as is shown in Figure 1 is not essential. An arrangement like that shown in Figure 2 could be used. Here the test-piece aperture 9' is in the form of a re-entrant tube and there are several auxiliary apertures 8'. The principle is exactly the same.

If all the auxiliary apertures 8' are of the same size, it is not necessary that the velocity of flow should be measured through more than one of them.

It is essential that the stream or streams of air which pass through the auxiliary aperture or apertures and the stream through the test-piece aperture should be distinct from each other in order to ensure that the rate of flow through the auxiliary aperture or apertures may be dependent upon the degree to which the test-piece aperture is obstructed.

Apparatus of the general form shown in Figure 2 is more suitable for the testing of imperforate objects such as aerofoils. Such an object is shown diagrammatically at 11.

The practical form of the apparatus shown in Figures 3–6 comprises a wind tunnel 2 having a centrifugal fan 3 at its right hand end.

At its left hand end, the tunnel has a flange 6 provided with a number of apertures 8'. The flange 6 and the apertures 8' correspond to the plate 6 and the auxiliary apertures 8 of Figures 1 and 2. An annular plate 7 corresponding to the plate 7 in Figure 1 is mounted within the flange 6 and has an aperture 9' in it which corresponds to the test-piece aperture in Figures 1 and 2. The plate 7 and flange 6 together form an end wall for the tunnel 2.

Bungs 12 are provided for closing the auxiliary apertures 8' and a friction held sliding shutter 13 is provided for closing the test-piece aperture 9. Surrounding the apertures 9' are turnbuckles 17.

Figure 7:
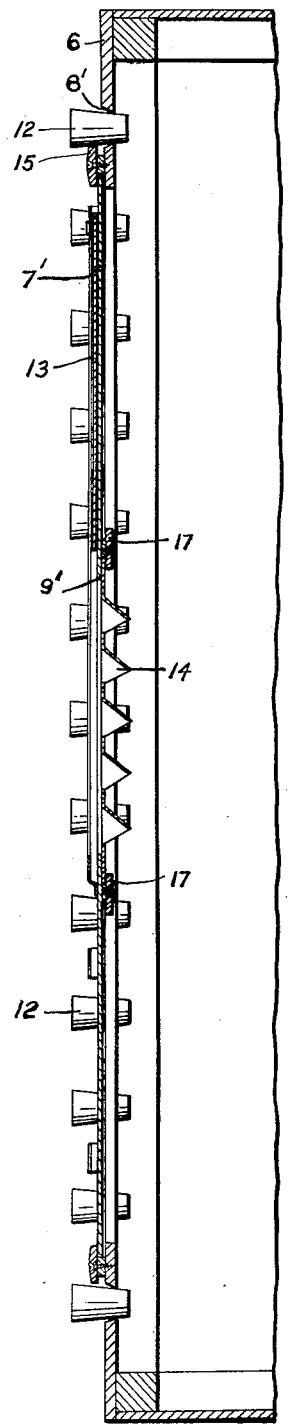
Figure 7 is an enlarged vertical section taken along the line VII—VII of Figure 4.

The auxiliary apertures 8' are spaced away from the wall of the wind tunnel so that there is no interference with the free flow of air through them and they are champfered as shown in Figures 5, 6 and 7. Streams of air having only a small degree of turbulence can, therefore, be produced through them. The degree of turbulence can be decreased still further by the use of bell-mouthed apertures. As will be seen further on, however, it is not essential that the flow through the auxiliary apertures be non-turbulent.

It will be assumed that the efficiency of a ventilator of the kind shown in British Patent Specification No. 551,198 is to be determined. This is done as follows:

The ventilator 14 is mounted by the turnbuckles 17 in the aperture 9' which is the same size as the opening in which it would be mounted in use. A number of auxiliary apertures 8' are opened by removal of their bungs 12.

The fan 3 is started up and when it is running steadily at a given speed, the velocity ($V_1$) of flow of air through one of the auxiliary apertures 8' is measured by means of the Pitot tube 10. All the auxiliary apertures 8' being alike, the single reading thus obtained applied to all of them.

The shutter 13 is then closed so that no air can pass through the ventilator. The fan is kept running at the same rate, that is, at the same output. The type of fan that is chosen is one which will give a constant output over a wide range of pressures.

The air which previously passed through the ventilator will now pass through the auxiliary apertures and the increased velocity ($V_2$) through those apertures will be measured by the Pitot tube.

The amount of air ($Q_1$) which passed through the ventilator can be expressed $$Q_1 = na(V_2 - V_1)$$

where $n$ = number of auxiliary apertures open and $a$ = effective area of each auxiliary aperture.

By making a series of tests at different fan outputs, a curve can be drawn expressing the relationship between the amount of air passing through the ventilator ($Q_1$) and the velocity of the air impinging on the ventilator ($V_2$).

If the test is repeated to obtain comparative readings with the ventilator in the test-piece aperture and with the test-piece aperture fully open, the obstruction to air-flow caused by the ventilator can be determined.

$Q_2$ = amount of air which the ventilator has prevented from going through the test-piece aperture.

By making a series of tests at different fan outputs, a curve similar to that referred to above can be drawn relating to the obstruction caused by the ventilator.

The efficiency of the ventilator can be expressed as $$E = \frac{Q_1}{Q_1 + Q_2}$$

and this can, therefore, be determined by taking no other experimental readings than the air velocity through the auxiliary apertures under the conditions set out above.

If the total area of the auxiliary aperture is very small or very large compared with the area of the test-piece aperture or with the free flow area of the test-piece, the result obtained will be slightly inaccurate. This inaccuracy can be guarded against by an appropriate choice of the number of auxiliary apertures which are opened.

Where the tunnel is to be used for testing a range of standard size objects, such as a series of ventilators of different sizes a number of interchangeable annular plates 7' can be provided each having a test-piece aperture of a different size. The plate 7' is easily removed and replaced as it is held in place very simply by a series of turnbuckles 15.

The tunnel can be used also for visual testing such as by observation of coloured smokes and the like passing through or past a test-piece. For this purpose, it is provided with a window 16.

The great merit of the invention lies in its simplicity both as to the apparatus involved and as to the use of the apparatus. Testing of an object such as a ventilator of the kind referred to above is, today, considered to be a difficult and tiresome task as the method used is to take direct readings of the air-flow on the outlet side. A large number of readings have to be taken in order to obtain a reasonably accurate average reading and when this has been done, tiresome calculations based on direct measurements of free-flow areas of the ventilator have to be undertaken. The unavoidable errors are very considerable so that the final result is less accurate than that obtained by the use of the invention as well as taking much more time to obtain.

The use of auxiliary apertures 8' which give reasonably smooth air-flow has the advantage that a simple instrument such as a Pitot tube can be used for the direct measurement of the velocity of flow in a stream passing through the aperture. This, however, is not essential, as the velocity of flow can be determined by taking readings of the pressure difference on either side of the screen 7'. For this purpose a standard form of manometer for measuring small pressure differences such as are commonly used in aerodynamic laboratories can be used.

It will be appreciated too that the auxiliary apertures need not all be of the same size or shape although it is convenient that they should be identical.

Furthermore, the auxiliary apertures need not be in the end wall of the tunnel. They could, if desired, be in the side wall.

The invention has been described in detail above with particular reference to air and to ventilators. It can however be used with gaseous fluids other than air. Also, it can be used to obtain data regarding any object which can be mounted in an aperture as described here and for determining the characteristics of an aperture. In the latter case, the aperture under test will be regarded as the test-piece.

I claim:

1. A method of indirectly determining the flow of a gaseous fluid across past or through a test-piece comprising the steps of impelling fluid in separate streams simultaneously through an aperture containing said piece and through an auxiliary aperture at a predetermined rate of total flow, measuring the rate of flow of the fluid through said auxiliary aperture both with said test-piece aperture closed and with that aperture obstructed by said test-piece and evaluating the flow across said test-piece from the difference in the rate of flow through said auxiliary aperture.

2. A method of determining the flow of fluid across a test piece comprising the steps of impelling fluid in separate streams simultaneously across said test piece and through an auxiliary aperture at a predetermined rate of total flow, measuring the flow through the auxiliary aperture, precluding the flow across said test piece and measuring the flow through said auxiliary aperture alone when the flow across said test piece is precluded, and comparing the resultants.

3. Apparatus for indirectly determining the flow of a gaseous fluid across a test piece comprising a suction tunnel and means for drawing a current of air through said tunnel, an end wall for said tunnel on the intake side of said suction means, said tunnel providing a clear passage between said suction means and end wall and said end wall being formed with a plurality of openings for passing air, one of which is adapted to receive the test piece, means for measuring the velocity of flow of air through another of said openings, and shutter means for closing the test piece opening, whereby the obstruction to flow caused by said test piece may be determined by measuring the flow through said other opening with the test piece opening closed and with it open but obstructed by said test piece.

4. Apparatus as defined in claim 3 wherein said end wall is formed with a plurality of openings in addition to the test piece opening and means are provided for closing at least one of said additional openings.

5. Apparatus for indirectly determining the air flow by a test-piece, comprising a wind tunnel including means for causing a steady current of air therethrough, said wind tunnel being provided with an aperture on its inlet side in which the test piece can be mounted, and at least one auxiliary aperture on said inlet side arranged so that the air which passes therethrough does not also pass through said test-piece aperture, shutter means for closing said test-piece aperture, and means for measuring the velocity of flow through said auxiliary aperture.

6. Apparatus for indirectly determining the flow of a gaseous fluid across a test-piece, comprising a passageway for the fluid, a wall fixed across one end of said passageway, means within said passageway for creating a difference of pressure in the fluid on either side of said wall, said means freely communicating with said wall through said passageway, said wall being formed with an aperture therein for receiving the test-piece and at least one auxiliary aperture therein disposed to by-pass said test-piece, and means for determining the velocity of flow through said auxiliary aperture by measuring the pressure difference causing that flow.

LEONARD GORDON DAVIES.

REFERENCES CITED

The following references are of record in the file of this patent:

UNITED STATES PATENTS

| Number | Name | Date |
|---|---|---|
| 1,640,477 | Young | Aug. 20, 1927 |
| 2,067,645 | Pinkerton | Jan. 12, 1937 |
| 2,293,725 | Fiock et al. | Aug. 25, 1942 |
| 2,380,516 | Goldberg | July 31, 1945 |

FOREIGN PATENTS

| Number | Country | Date |
|---|---|---|
| 125,564 | Great Britain | Apr. 24, 1919 |
| 842,541 | France | Mar. 6, 1939 |